July 19, 1927. 1,636,049

C. FORSBERG

OIL INDICATOR FOR GAS MOTORS

Filed March 24, 1921

Inventor.
Charles Forsberg

Patented July 19, 1927.

1,636,049

UNITED STATES PATENT OFFICE.

CHARLES FORSBERG, OF ST. LOUIS, MISSOURI.

OIL INDICATOR FOR GAS MOTORS.

Application filed March 24, 1921. Serial No. 455,064.

This invention relates more particularly to an improved float indicator to be used in connection with the crank case of an internal combustion motor for indicating the amount of oil contained in the housing.

Another object of the invention is to provide an oil float indicator with improved securing means which are co-operable with parts of an internal combustion motor whereby it can be readily attached and placed in communication with the crank case of the motor.

Other and further objects will appear in the specification and be specifically pointed out in the appended claim, reference being had to the accompanying drawings exemplifying the invention, and in which:

Figure 1:
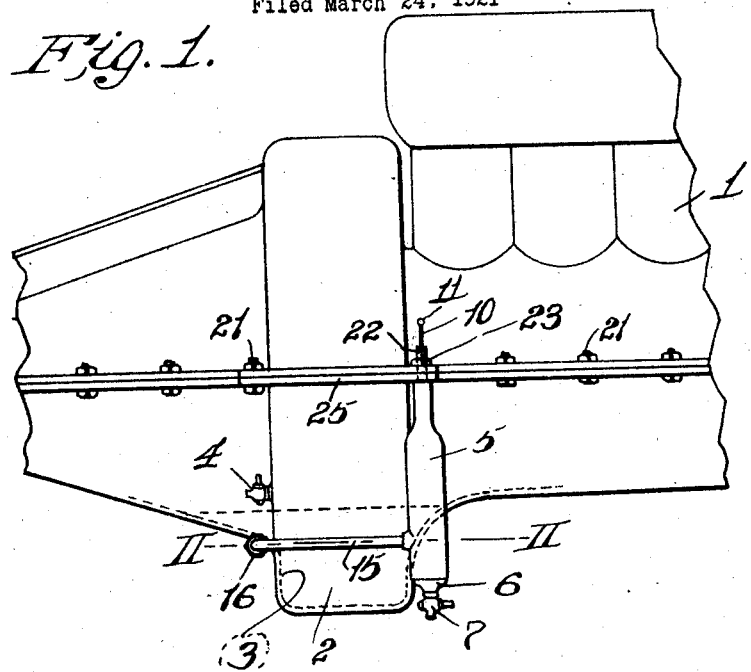
Fig. 1 is a fragmentary side elevation of an internal combustion motor showing this improved oil float indicating device attached thereto.
Figure 3:
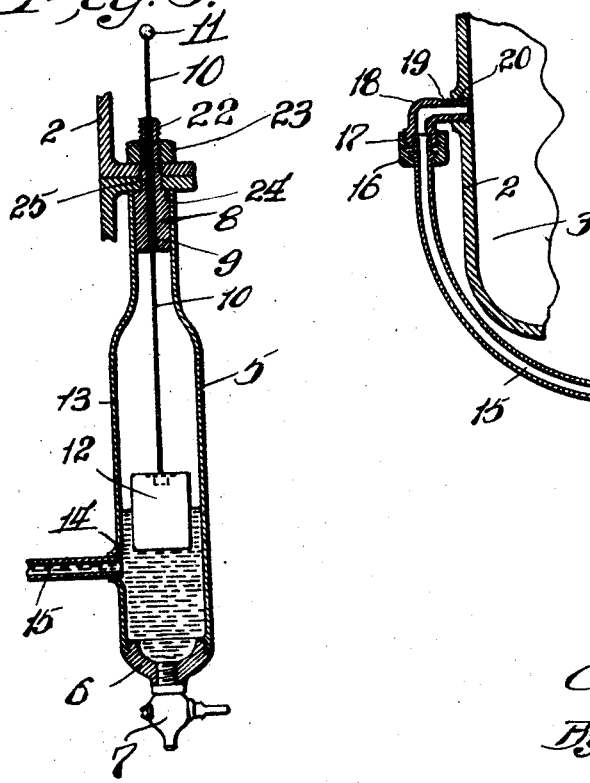
Fig. 3 is an enlarged vertical section taken on the line III—III of Fig. 2.

With reference to the accompanying drawings, 1 indicates a portion of an internal combustion motor, 2 the fly wheel housing in which is formed the oil pit 3.

This improved indicator is more particularly adapted to the well known Ford type of motors, in which the present form of oil indication is provided by a pair of upper and lower arranged pet-cocks, that communicate with the crank case, the rule to be followed thereby being that if oil flows from the upper arranged pet-cock which is designated as 4 when it is opened there is too much oil in the case and if no oil flows then there is not enough oil in the case.

This improved oil float indicator is comprised of a vertically arranged cylinder 5, which is closed at its lower end by a removable head 6 bearing a drain cock 7, the upper end of said cylinder being closed by a bushing 8 having a relatively long vertically extending guide-way 9 formed therethrough, and adapted to reciprocate in said guide-way is a rod 10, bearing an indicating portion 11 at its upper end, and secured to the lower end of said rod in said cylinder is a float 12.

Formed in the wall 13 of the cylinder 5 adjacent its lower end is an opening 14 and secured in said opening is one end of a curved tube 15, the opposite end of said tube bearing a packing-nut 16, which is co-operable with the threaded end 17 of an elbow 18, the oppositely threaded end 19 of said elbow being engaged in the threaded opening 20 formed in the wall of the case 2, said opening being the lowermost of the pair of openings provided for the pair of gage-cocks aforementioned as being used heretofore.

In securing a device of this improved character to the crank case of a motor one of the bolts 21 is removed from its clamping engagement with the clamping flanges of the case 2 and the threaded extension 22 forming part of the bushing 8 of the cylinder 5 is upwardly extended within the bolt opening from which the bolt 21 has just been removed. Then a nut 23 is engaged over said threaded end 22 and the shoulder 24 formed on the bushing 8 is securely clamped beneath the lowermost housing flange 25.

Figure 2:
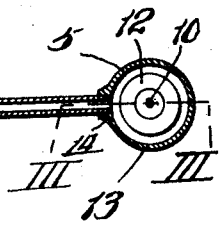
Fig. 2 is an enlarged horizontal section taken on the line II—II of Fig. 1.

In securing the cylinder 5 in its vertically suspended position, care is taken so that the curved tube 15 will encircle a portion of the case as shown in Fig. 2, so that the extending end of the tube on which the packing-nut 16 is mounted will be adjacent the elbow 18 when the threaded end 19 of said elbow is engaged in the threaded opening 20.

This threaded opening 20 is heretofore provided for the lowermost pet-cock aforereferred to relative to the old oil gaging system which was used as a drain cock, the pet cock thereof, however, being removed for the reception of the threaded end 19 of the elbow 18. The packing nut 16 is then engaged to the threaded end 17 of the elbow 18 and the dismantled pet cock from the threaded opening 20 of the housing 2 can serve as the drain cock 7 to the lower head of the cylinder 5.

This improved device after being mounted as just described is ready for operation and on account of the communication established between the oil pit 3 and the cylinder 5 by the tube 15, it is obvious that the oil level of the pit 3 of the case will be the same as that in the cylinder 5 providing the oil is above the tube 15 and in which the oil level of both the pit and the cylinder will be shown by the indicator 11 borne by the rod 10 by reason of the float 12 supported by the oil body of the cylinder.

In the use of gage glasses for indicating an oil level, the oil very soon discolors the glass so that it is very hard to distinguish the oil in the glass, but with a device of this improved character the position of the float within the cylinder relative to the depth of the oil body of the case can be readily discerned by the indicator 11 and on account of the specific construction disclosed for providing a securing device of this character to a standardized internal combustion motor, the adaptability thereof is made co-operable with the construction of the crank case.

What I claim is:

In an internal combustion motor the combination of a crank case having a horizontally extending apertured flange formed integral therewith, a cylinder arranged vertically and provided at its upper end with a bushing smaller in diameter than the adjacent portion of said end and extending through the aperture in said flange, securing means mounted on the upper end of said bushing for securing said cylinder to said flange, a float mounted in said cylinder, a gage rod borne by said float and extending through and above said bushing, and a tube extending from said crank case to the lower end of said cylinder.

CHARLES FORSBERG.